United States Patent
Ootomo et al.

(10) Patent No.: US 10,703,677 B2
(45) Date of Patent: Jul. 7, 2020

(54) SIC SINTERED BODY, HEATER AND METHOD FOR PRODUCING SIC SINTERED BODY

(71) Applicant: SUMITOMO OSAKA CEMENT CO., LTD., Tokyo (JP)

(72) Inventors: Megumi Ootomo, Tokyo (JP); Hiroaki Nagatomo, Tokyo (JP); Kentaro Takahashi, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 16/494,852

(22) PCT Filed: Jul. 11, 2018

(86) PCT No.: PCT/JP2018/026170
§ 371 (c)(1),
(2) Date: Sep. 17, 2019

(87) PCT Pub. No.: WO2019/013247
PCT Pub. Date: Jan. 17, 2019

(65) Prior Publication Data
US 2020/0024196 A1    Jan. 23, 2020

(30) Foreign Application Priority Data

Jul. 12, 2017 (JP) ................. 2017-136186
Jun. 28, 2018 (JP) ................. 2018-123595

(51) Int. Cl.
C04B 35/565 (2006.01)
C04B 35/575 (2006.01)
H05B 3/14 (2006.01)
C04B 35/584 (2006.01)

(52) U.S. Cl.
CPC .......... *C04B 35/575* (2013.01); *C04B 35/584* (2013.01); *H05B 3/14* (2013.01); *C04B 2235/5418* (2013.01)

(58) Field of Classification Search
CPC ................ C04B 35/575; C04B 35/584; C04B 2235/5418; H05B 3/14
See application file for complete search history.

(56) References Cited

U.S. PATENT DOCUMENTS

2010/0130344 A1*   5/2010   Mikijelj .............. C04B 35/5603
501/91

FOREIGN PATENT DOCUMENTS

| JP | H09-255428 A | 9/1997 | |
|---|---|---|---|
| JP | 2001-261441 A | 9/2001 | |
| JP | 2007-320787 A | 12/2007 | |
| JP | 2007320787 A * | 12/2007 | ........... C04B 35/573 |
| WO | 2017/038555 A1 | 3/2017 | |

OTHER PUBLICATIONS

International Search Report for PCT/JP2018/026170 (dated Oct. 2, 2018).
Office Action for Japanese Patent Application No. 2018-123595 (dated Oct. 2, 2018).

* cited by examiner

*Primary Examiner* — Noah S Wiese
(74) *Attorney, Agent, or Firm* — Merchant & Gould P.C.

(57) ABSTRACT

Provided is a SiC sintered body which contains nitrogen atoms, wherein a ratio $R_{max}/R_{ave}$ of a maximum volume resistivity $R_{max}$ of the sintered body to an average volume resistivity $R_{ave}$ of the sintered body is 1.5 or lower; a ratio $R_{min}/R_{ave}$ of a minimum volume resistivity $R_{min}$ of the sintered body to the average volume resistivity $R_{ave}$ is 0.7 or higher; and a relative density of the sintered body is 98% or higher.

9 Claims, No Drawings ated particle diameter of 0.1 µm or higher and 2.0 µm or lower; and a step of
SIC SINTERED BODY, HEATER AND METHOD FOR PRODUCING SIC SINTERED BODY

TECHNICAL FIELD

The present application is a U.S. National Stage Application under 35 U.S.C. 071 of International Patent Application No. PCT/JP2018/026170, filed on Jul. 11, 2018, which claims priority to Japanese Patent Application No. 2017-136186 filed in Japan on Jul. 12, 2017, and Japanese Patent Application No. 2018-123595 filed in Japan on Jun. 28, 2018, the disclosures of all of which are hereby incorporated by reference in their entireties.

BACKGROUND

Conventionally, there is known a silicon carbide (SiC) sintered body obtained by forming a SiC powder and then sintering the formed SiC powder. The SiC sintered body is used in many fields because of excellent heat resistance, thermal shock resistance, corrosion resistance, and high temperature strength property thereof. In addition, the thermal shock resistance means a property that is not easily damaged by sudden temperature changes (thermal shock). In addition, the high temperature strength property means strength in a high temperature region.

In addition, the SiC sintered body exhibits conductivity and is therefore widely used as a resistance heating element. In order to improve the heat generation property of the resistance heating element, development focusing on a specific resistance value of the SiC sintered body has been conducted (for example, Patent Literature No. 1 and Patent Literature No. 2).

Patent Literature No. 1 discloses a method of controlling a specific resistance value of a silicon carbide sintered body. In the method disclosed in Patent Literature No. 1, first, an α-SiC powder having an average particle diameter of 0.1 µm or higher and 10 µm or lower, a β-SiC powder having an average particle diameter of 0.1 µm or higher and 10 µm or lower, and a SiC ultrafine powder having an average particle diameter of lower than 0.1 µm and synthesized in a gas phase by plasma CVD are mixed in a desired ratio to obtain a SiC mixed powder. Next, the specific resistance value of the silicon carbide sintered body can be controlled in a wide range of about $1.0 \times 10^{-3}$ to $1.0 \times 10^{2}$ Ω·cm by heating and sintering the obtained SiC mixed powder.

Patent Literature No. 2 discloses a method for producing a conductive SiC sintered body which exhibits easy control of resistance at the time of production and has a relative density of 90% or higher.

In the production method disclosed in Patent Literature No. 2, a mixture of a SiC powder having an average particle diameter of 2 µm or lower and a sintering aid is formed into a formed body, and the formed body is heated and sintered at a temperature of 2100° C. to 2300° C. in an inert atmosphere containing 30 to 90% by volume of nitrogen gas. B compounds such as B, $B_4C$, and BN, and carbon sources such as carbon black and phenol resin are used as the sintering aid. Thereby, a conductive SiC sintered body having properties of a specific resistance value of 10 Ω·cm or lower and a relative density of 90% or higher is obtained in the production method disclosed in Patent Literature No. 2.

CITATION LIST

Patent Literature

[Patent Literature No. 1] Japanese Laid-open Patent Publication No. 09-255428
[Patent Literature No. 2] Japanese Laid-open Patent Publication No. 2001-261441

SUMMARY OF INVENTION

Technical Problem

However, in the SiC sintered body obtained by the method disclosed in Patent Literature No. 1 and Patent Literature No. 2, the volume resistivity may vary greatly depending on the measurement position. For example, in a case where a heating element is produced using a SiC sintered body whose volume resistivity varies greatly depending on the measurement position, the value of the current flowing through the heating element becomes uneven in a high temperature region, and therefore the in-plane temperature may become uneven.

In addition, the SiC sintered body obtained by the method disclosed in Patent Literature No. 2 has been required to further improve the density thereof.

The present invention has been made in view of the above circumstances, and provides a SiC sintered body having a high density and a volume resistivity that is unlikely to vary depending on the measurement position, a heater including the SiC sintered body, and a method for producing a SiC sintered body which is capable of producing the SiC sintered body. Here, the "density" represents "relative density".

Solution to Problem

One aspect of the present invention provides a SiC sintered body which contains nitrogen atoms, and wherein a ratio of a maximum volume resistivity $R_{max}$ of the SiC sintered body to an average volume resistivity $R_{ave}$ of the SiC sintered body, namely $R_{max}/R_{ave}$ is 1.5 or lower; a ratio of a minimum volume resistivity $R_{min}$ of the SiC sintered body to the average volume resistivity $R_{ave}$, namely $R_{min}/R_{ave}$ is 0.7 or higher; and a relative density of the SiC sintered body is 98% or higher.

One aspect of the present invention may have a configuration in which the content of nitrogen atoms in the SiC sintered body is 5000 ppm or less.

One aspect of the present invention provides a heater including the above-mentioned SiC sintered body.

One aspect of the present invention provides a method for producing a SiC sintered body, including a step of mixing at least one SiC powder having an average particle diameter of 0.1 µm or higher and 1.0 µm or lower and selected from the group consisting of α-SiC powder and β-SiC powder, a SiC ultrafine powder having an average particle diameter of lower than 0.1 µm and synthesized in a gas phase by plasma CVD, and $Si_3N_4$ particles having an average particle diameter of 0.1 µm or higher and 2.0 µm or lower; and a step of sintering a mixture obtained in the step of mixing, in which, in the step of mixing, the SiC ultrafine powder is mixed in an amount of more than 2 parts by mass and less than 20 parts by mass with respect to 100 parts by mass of the SiC powder, and the $Si_3N_4$ particles are mixed in an amount of 0.05 parts by mass or more and 3 parts by mass or less with respect to 100 parts by mass of the SiC powder, and in the step of sintering, the mixture is sintered at a temperature of lower than 2400° C.

Advantageous Effects of Invention

According to one aspect of the present invention, provided are a SiC sintered body having a high density and a volume resistivity that is unlikely to vary depending on the measurement position, a heater including the SiC sintered body, and a method for producing a SiC sintered body which is capable of producing the SiC sintered body.

DESCRIPTION OF EMBODIMENTS

<Method for Producing SiC Sintered Body>

The method for producing a SiC sintered body according to the present embodiment includes a step of mixing a SiC powder, a SiC ultrafine powder, and $Si_3N_4$ particles, and a step of forming the mixture obtained in the step of mixing and then sintering the obtained formed body.

[SiC Powder]

In the production method of the present embodiment, a SiC powder having an average particle diameter of 0.1 µm or higher and 1.0 µm or lower is used. In a case where the average particle diameter of the SiC powder is 0.1 µm or higher and 1.0 µm or lower, the mixture before sintering is easily sintered and easy to handle.

In the present embodiment, the average particle diameter of the SiC powder was determined by measuring the diameters of 500 randomly selected SiC powders using a scanning electron microscope (SEM), and adopting the average value of the obtained measured values.

In the SiC powder for use in the production method of the present embodiment, a large number of crystal structures are known. With regard to the crystal structure of the SiC powder, a SiC powder having a 3C type (zinc blende type) crystal structure in a cubic system, a SiC powder having a wurtzite type crystal structure in a hexagonal system of a 4H type, a 6H type, or the like, and a SiC powder having a 15R type crystal structure in a rhombohedral system can be given as examples.

Among these, the SiC powder having a 3C type crystal structure is referred to as "β-SiC powder". In addition, all SiC powders having a crystal structure other than the 3C type crystal structure are referred to as "α-SiC powder".

At least one SiC powder selected from the group consisting of α-SiC powder and β-SiC powder is used in the production method of the present embodiment. In a case where both α-SiC powder and β-SiC powder are used, the mixing ratio of α-SiC powder and β-SiC powder is not particularly limited.

Generally, a SiC powder produced by a silica reduction method, an Acheson process or the like can be used in the production method of the present embodiment. However, for applications requiring high purity (for example, a heating element used in a semiconductor production process), a high purity SiC sintered body to which an acid treatment or the like has been applied in addition to these production methods is used.

[SiC Ultrafine Powder]

A SiC ultrafine powder having an average particle diameter of lower than 0.1 µm is used in the production method of the present embodiment. In a case where the average particle diameter of the SiC ultrafine powder is lower than 0.1 µm, a large amount of the SiC ultrafine powder is likely to be present at the crystal grain boundaries in the SiC sintered body, and the mixture before sintering is easily sintered. As a result, a SiC sintered body having a high relative density can be obtained.

In the present embodiment, the relative density of the SiC sintered body is determined by measuring an apparent density of the SiC sintered body using the Archimedes method and determining the ratio of the measured apparent density to a theoretical density of SiC.

The average particle diameter of the SiC ultrafine powder is preferably 0.08 µm or lower, more preferably 0.07 µm or lower, and still more preferably 0.06 µm or lower.

The average particle diameter of the SiC ultrafine powder is preferably 0.01 µm or higher, more preferably 0.02 µm or higher, and still more preferably 0.03 µm or higher.

The average particle diameter of the SiC ultrafine powder is preferably 0.01 µm or higher and 0.08 µm or lower, more preferably 0.02 µm or higher and 0.07 µm or lower, and still more preferably 0.03 µm or higher and 0.06 µm or lower.

In the production method of the present embodiment, the upper limit value and the lower limit value of the average particle diameter of the SiC ultrafine powder can be arbitrarily combined.

In the present embodiment, the average particle diameter of the SiC ultrafine powder is measured by the same method as in the average particle diameter of the SiC powder.

The SiC ultrafine powder used in the production method of the present embodiment is different from the above-mentioned SiC powder in the range of the average particle diameter, and the other points are the same as the SiC powder.

The mixing amount of the SiC ultrafine powder in the production method of the present embodiment is preferably more than 2 parts by mass with respect to 100 parts by mass of the SiC powder. In a case where the mixing amount of the SiC ultrafine powder is more than 2 parts by mass, the relative density of the SiC sintered body becomes sufficiently high.

The mixing amount of the SiC ultrafine powder is less than 20 parts by mass with respect to 100 parts by mass of the SiC powder. In a case where the mixing amount of the SiC ultrafine powder is 20 parts by mass or more, the SiC ultrafine powder is easily aggregated. This makes it difficult for the SiC ultrafine powder to enter the voids between the particles of the SiC powder and the $Si_3N_4$ particles. As a result of investigations by the present inventors, it has been found that the filling rate of the SiC ultrafine powder in the mixture before sintering is reduced. Therefore, the relative density of the SiC sintered body after sintering is lowered.

The mixing amount of the SiC ultrafine powder is more preferably 15 parts by mass or less and still more preferably 10 parts by mass or less.

The mixing amount of the SiC ultrafine powder is more than 2 parts by mass and preferably 3 parts by mass or more.

The mixing amount of the SiC ultrafine powder is preferably more than 2 parts by mass and less than 20 parts by mass, more preferably 3 parts by mass or more and 15 parts by mass or less, and still more preferably 3 parts by mass or more and 10 parts by mass or less with respect to 100 parts by mass of the SiC powder.

In the production method of the present embodiment, the upper limit value and the lower limit value of the mixing amount of the SiC ultrafine powder can be arbitrarily combined.

In the production method of the present embodiment, the SiC ultrafine powder synthesized in a gas phase by plasma CVD is used.

The synthesis conditions of the SiC ultrafine powder are not particularly limited, but are preferably such that a silane compound or silicon halide and a hydrocarbon source gas are introduced into the plasma in a non-oxidizing atmosphere, and are then subjected to a gas phase reaction while controlling the pressure of the reaction system in the range of lower than 1 atm to 13.3 Pa.

The crystal phase of the SiC ultrafine powder used in the production method of the present embodiment is not particularly limited, but is preferably a SiC ultrafine powder ($\beta$-SiC ultrafine powder) having a 3C type crystal structure, an amorphous SiC ultrafine powder, or a mixed phase thereof. This improves the sinterability of the mixture before sintering, and also improves the electrical and mechanical properties of the mixture.

In the production method of the present embodiment, it is more preferable to use the $\beta$-SiC ultrafine powder among the crystal phases of the SiC ultrafine powder. The $\beta$-SiC ultrafine powder has a small aspect ratio and excellent dispersibility. In addition, the $\beta$-SiC ultrafine powder exhibits excellent electrical conductivity. Therefore, the average volume resistivity of the SiC sintered body can be reduced by simply mixing a small amount of the $\beta$-SiC ultrafine powder.

In the present embodiment, a value obtained by measuring the SiC sintered body by a four-probe measurement method was adopted as the volume resistivity of the SiC sintered body. In addition, an average value of five measured values obtained for any five places in the plane of the SiC sintered body was adopted as the average volume resistivity of the SiC sintered body.

[$Si_3N_4$ Particles]

In the production method of the present embodiment, a SiC sintered body in which nitrogen is solid-dissolved is obtained by mixing $Si_3N_4$ particles together with the SiC powder and the SiC ultrafine powder. Free electrons are increased in the SiC sintered body in which nitrogen is solid-dissolved and therefore, the average volume resistivity of the SiC sintered body is reduced as compared with a SiC sintered body in which nitrogen is not solid-dissolved.

In the production method of the present embodiment, nitrogen can be uniformly distributed in the SiC sintered body by adjusting the average particle diameter of the $Si_3N_4$ particles to be mixed. Thus, the volume resistivity of the SiC sintered body is unlikely to vary depending on the measurement position. As a result, in a case of a heating element using a SiC sintered body as a forming material, it is easy to control the in-plane temperature uniformly.

In the production method of the present embodiment, $Si_3N_4$ particles having an average particle diameter of 0.1 μm or higher and 2.0 μm or lower are used. In a case where the average particle diameter of the $Si_3N_4$ particles is 0.1 μm or higher, the $Si_3N_4$ particles can be easily obtained and handled. In addition, in a case where the average particle diameter of the $Si_3N_4$ particles is 2.0 μm or lower, nitrogen can be uniformly distributed in the SiC sintered body.

The average particle diameter of the $Si_3N_4$ particles is preferably 0.15 μm or higher and more preferably 0.2 μm or higher.

The average particle diameter of the $Si_3N_4$ particles is preferably 0.15 μm or higher and 2.0 μm or lower and more preferably 0.2 μm or higher and 2.0 μm or lower.

In the production method of the present embodiment, the upper limit value and the lower limit value of the average particle diameter of the $Si_3N_4$ particles can be arbitrarily combined.

In the present embodiment, the average particle diameter of the $Si_3N_4$ particles is measured by the same method as in the average particle diameter of the SiC powder.

In the production method of the present embodiment, the mixing amount of the $Si_3N_4$ particles is 0.05 parts by mass or more and 3 parts by mass or less with respect to 100 parts by mass of the SiC powder. The average volume resistivity of the SiC sintered body can be sufficiently lowered in a case where the mixing amount of the $Si_3N_4$ particles is 0.05 parts by mass or more. In addition, in a case where the mixing amount of the $Si_3N_4$ particles is 3 parts by mass or less, the $Si_3N_4$ particles can be sufficiently solid-dissolved in the SiC sintered body. In addition, the relative density of the SiC sintered body becomes sufficiently high in a case where the mixing amount of the $Si_3N_4$ particles is 3 parts by mass or less. In addition, in a case where the mixing amount of the $Si_3N_4$ particles is more than 3 parts by mass, voids formed by sublimation of $Si_3N_4$ particles that cannot be solid-dissolved are increased, and therefore the relative density is decreased.

The mixing amount of the $Si_3N_4$ particles is more preferably 0.1 parts by mass or more and still more preferably 0.5 parts by mass or more.

The mixing amount of the $Si_3N_4$ particles is more preferably 2 parts by mass or less and still more preferably 1.5 parts by mass or less.

The mixing amount of the $Si_3N_4$ particles is more preferably 0.1 parts by mass or more and 2 parts by mass or less and still more preferably 0.5 parts by mass or more and 1.5 parts by mass or less with respect to 100 parts by mass of the SiC powder.

In the production method of the present embodiment, the upper limit value and the lower limit value of the mixing amount of the $Si_3N_4$ particles can be arbitrarily combined.

[Other Materials]

In the production method of the present embodiment, materials other than the above-mentioned SiC powder, SiC ultrafine powder, and $Si_3N_4$ particles may be mixed, as needed, as long as the effects of the present invention are not impaired. Such materials include a forming binder such as polyvinyl alcohol or polyvinyl pyrrolidone, a dispersant such as stearate, and the like.

[Step of Mixing]

In the step of mixing in the present embodiment, the above-mentioned SiC powder, SiC ultrafine powder, and $Si_3N_4$ particles are mixed. The mixing method thereof is not particularly limited, but is preferably pulverizing and mixing by a two-stream particle collision type pulverizing and mixing apparatus. Thereby, the above-mentioned SiC powder, SiC ultrafine powder, and $Si_3N_4$ particles can be uniformly dispersed, and the particle size distribution of the obtained mixture can be narrowed. As a result of the narrowed particle size distribution of the mixture, coarsening of the sintered body particles can be suppressed in the subsequent sintering step.

[Step of Sintering]

In the sintering step of the present embodiment, first, the mixture obtained in the step of mixing is formed. Although the forming method of the mixture is not particularly limited, a forming method using a uniaxial press is preferable. For example, the mixture is formed into a disc by a uniaxial press.

Next, the formed body obtained by forming the mixture is sintered. The sintering method of the formed body is not particularly limited. The sintering method of the formed body may be a conventional method, for example, pressure sintering using a hot press container (hot press sintering), normal pressure sintering, or sintering using hot isostatic pressing (HIP). Among the sintering methods of the formed body, hot press sintering is preferable. In hot press sintering of the formed body, a SiC sintered body having a high relative density is obtained.

In hot press sintering, specifically, the formed body is packed in a hot press container and sintered under pressure in a non-oxidizing atmosphere.

In the above-mentioned hot press sintering, the sintering temperature is lower than 2400° C., and preferably 2200° C. or higher and 2300° C. or lower. In a case where the sintering temperature is 2200° C. or higher, a SiC sintered body having a sufficiently high relative density can be obtained. In addition, in a case where the sintering temperature is lower than 2400° C., particularly 2300° C. or lower, coarsening of the sintered body particles is suppressed, and therefore β-SiC does not undergo phase transition to α-SiC. Therefore, the volume resistivity of the obtained SiC sintered body is unlikely to vary depending on the measurement position.

The above-mentioned hot press sintering is carried out under a pressure of 20 Mpa or higher at a sintering temperature of 2200° C. or higher and 2300° C. or lower.

In the above-mentioned hot press sintering, in a case where the rate of temperature increase is fast, the sintering time of the formed body tends to be sufficiently short, and therefore the production cost of the SiC sintered body tends to be kept low. In addition, in a case where the rate of temperature increase is slow, the occurrence of cracks during sintering of a formed body tends to be suppressed, and therefore a good-quality SiC sintered body tends to be obtained. Based on such a tendency, the rate of temperature increase in the above-mentioned hot press sintering may be determined.

In the above-mentioned hot press sintering, the pressure is preferably 20 MPa or higher. Thereby, a SiC sintered body having a high relative density can be obtained.

In the hot press sintering, the pressure is more preferably 20 MPa or higher and 45 MPa or lower.

In the above-mentioned hot press sintering, the non-oxidizing atmosphere is preferably an argon atmosphere.

According to the present embodiment, there is provided a method for producing a SiC sintered body, which is capable of producing a SiC sintered body having a high density and a volume resistivity that is unlikely to vary depending on the measurement position.

[SiC Sintered Body]

The SiC sintered body of the present embodiment can be obtained by using the above-mentioned production method.

In the SiC sintered body of the present embodiment, nitrogen is solid-dissolved by mixing $Si_3N_4$ particles with a SiC powder and a SiC ultrafine powder at the time of production.

The content of nitrogen atoms in the SiC sintered body of the present embodiment is preferably 40 ppm or more.

In addition, the content of nitrogen atoms in the SiC sintered body is preferably 5000 ppm or less, more preferably 1000 ppm or less, and still more preferably less than 150 ppm.

The content of nitrogen atoms in the SiC sintered body is preferably 40 ppm or more and 5000 ppm or less, more preferably 40 ppm or more and 1000 ppm or less, and still more preferably 40 ppm or more and less than 150 ppm.

In the SiC sintered body of the present embodiment, the upper limit value and the lower limit value of the nitrogen atom content can be arbitrarily combined.

The content of nitrogen atoms in the SiC sintered body of the present embodiment can be controlled within the range described above by adjusting the mixing amount of $Si_3N_4$ particles to be mixed.

Since the SiC sintered body in which nitrogen is solid-dissolved becomes an n-type semiconductor, the SiC sintered body of the present embodiment has a small average volume resistivity. The average volume resistivity of the SiC sintered body of the present embodiment is preferably 0.001 Ω·cm or higher and 100 Ω·cm or lower. In a case where the SiC sintered body of the present embodiment is used as a material for forming a heating element, the average volume resistivity of the SiC sintered body is preferably 10 Ω·cm or lower and more preferably 0.001 Ω·cm or higher and 10 Ω·cm or lower.

In the SiC sintered body of the present embodiment, nitrogen is uniformly distributed by adjusting the average particle diameter of $Si_3N_4$ particles to be mixed at the time of production. Thus, the volume resistivity of the SiC sintered body is unlikely to vary depending on the measurement position.

Here, in the SiC sintered body of the present embodiment, the average volume resistivity of the SiC sintered body is taken as $R_{ave}$. In addition, the maximum volume resistivity of the SiC sintered body is taken as $R_{max}$. In addition, the minimum volume resistivity of the SiC sintered body is taken as $R_{min}$.

In the SiC sintered body of the present embodiment, the $R_{max}/R_{ave}$ is 1.5 or lower, preferably 1.3 or lower, and more preferably 1.1 or lower. The $R_{min}/R_{ave}$ is 0.7 or higher, preferably 0.8 or higher, and more preferably 0.9 or higher. In a case of satisfying both of that the $R_{max}/R_{ave}$ is 1.5 or lower and that the $R_{min}/R_{ave}$ is 0.7 or higher, it can be said that the volume resistivity of the SiC sintered body is unlikely to vary depending on the measurement position. As a result, in a case of a heating element using a SiC sintered body as a forming material, it is easy to control the in-plane temperature uniformly.

The $R_{max}/R_{ave}$ is preferably 0.7 or higher and 1.5 or lower, more preferably 0.8 or higher and 1.3 or lower, and still more preferably 0.9 or higher and 1.1 or lower.

The relative density of the obtained SiC sintered body is increased by mixing the SiC ultrafine powder having an average particle diameter of lower than 0.1 μm and synthesized in a gas phase by plasma CVD at the time of production of the SiC sintered body of the present embodiment. The relative density of the SiC sintered body of the present embodiment is preferably 98% or higher. In a case where the relative density of the SiC sintered body of the present embodiment is 98% or higher, the mechanical strength of the heating element using the SiC sintered body as a forming material is sufficient.

The relative density is preferably 98% or higher and 100% or lower.

According to the present embodiment, provided is a SiC sintered body having a high density and a volume resistivity that is unlikely to vary depending on the measurement position.

[Heating Element]

The SiC sintered body of the present embodiment can be used as a material for forming a conventionally known heating element. The SiC sintered body of the present embodiment can be suitably used, for example, as a heating element of a heater used in a semiconductor production process, since the volume resistivity of the SiC sintered body is unlikely to vary depending on the measurement position.

The heating element which uses the SiC sintered body of the present embodiment as a forming material has high mechanical strength and is capable of easily achieving uniform control of in-plane temperature.

EXAMPLES

Hereinafter, the present invention will be described by way of examples, but the present invention is not limited to these examples.

(Average Particle Diameter of SiC Ultrafine Powder)

The average particle diameter of the SiC ultrafine powder was determined by measuring the diameters of 500 randomly selected SiC ultrafine powders using a scanning electron microscope (SEM), and adopting the average value of the obtained measured values.

(Average Volume Resistivity of SiC Sintered Body)

The volume resistivity of the SiC sintered body was a value obtained by measuring the SiC sintered body by a four-probe measurement method (Loresta-GX MCP-T700, manufactured by Mitsubishi Chemical Analytech Co., Ltd.). In addition, the average volume resistivity ($R_{ave}$) of the SiC sintered body was an average value of the five measured values obtained for any five places in the plane of the SiC sintered body.

Furthermore, $R_{max}/R_{ave}$ and $R_{min}/R_{ave}$ were calculated using the maximum volume resistivity $R_{max}$ of the SiC sintered body and the minimum volume resistivity $R_{min}$ of the SiC sintered body, among the obtained measured values.

(Relative Density of SiC Sintered Body)

The relative density of the SiC sintered body was a value obtained by measuring an apparent density of the SiC sintered body using the Archimedes method and determining the ratio of the measured apparent density to a theoretical density of SiC.

(Nitrogen Content in SiC Sintered Body)

The nitrogen content in the SiC sintered body was measured by an inert gas melting/infrared absorption method using an oxygen and nitrogen analyzer TC-436 (manufactured by LECO Corporation).

<Production of SiC Sintered Body>

Examples 1 to 10 and Comparative Examples 1 to 7

First, a SiC ultrafine powder was synthesized in a gas phase by plasma CVD. Specifically, using silicon hydride ($SiH_4$) and ethylene ($C_2H_4$) as source gases, a SiC ultrafine powder having an average particle diameter of 0.01 μm was synthesized under a reaction system pressure of 10.665 Pa, in argon thermal plasma excited by a high frequency.

The gas-phase synthesized SiC ultrafine powder, a commercially available α-SiC powder (α-SiC 2500, average particle diameter: 0.63 μm, manufactured by Superior Graphite Co., Ltd.), a commercially available β-SiC powder (β-SiC 2500, average particle diameter: 0.63 μm, manufactured by Superior Graphite Co., Ltd.), and commercially available $Si_3N_4$ particles were pulverized and mixed by a two-stream particle collision type pulverizing and mixing apparatus at the ratio shown in Table 1. The addition amount of each component shown in Table 1 is a value in a case where the total amount of α-SiC and β-SiC is 100 parts by mass.

The obtained mixture was formed by a uniaxial press at a forming pressure of 20 MPa to obtain a disc-shaped formed body having a diameter of 400 mm and a thickness of 12 mm. This formed body was packed in a hot press container made of graphite and sintered at 2300° C. under a uniaxial pressure of 40 MPa in an argon atmosphere. Thus, a disc-shaped SiC sintered body was obtained.

TABLE 1

| | Blending | | | | | Sintering temperature (° C.) |
|---|---|---|---|---|---|---|
| | Raw material powder α/β | | Addition amount of SiC ultrafine powder (parts by mass) | Addition amount of $Si_3N_4$ (parts by mass) | Average particle diameter of $Si_3N_4$ (μm) | |
| | α-SiC (parts by mass) | β-SiC (parts by mass) | | | | |
| Example 1 | 95.2 | 4.8 | 5 | 0.5 | 0.2 | 2300 |
| Example 2 | 0 | 100 | 5 | 0.5 | 0.2 | 2300 |
| Example 3 | 95.3 | 4.7 | 5 | 0.5 | 2.0 | 2300 |
| Example 4 | 96.8 | 3.2 | 5 | 0.1 | 0.2 | 2300 |
| Example 5 | 95.2 | 4.8 | 5 | 3.0 | 0.2 | 2300 |
| Example 6 | 95.2 | 4.8 | 5 | 0.1 | 0.5 | 2300 |
| Example 7 | 0 | 100 | 12 | 0.1 | 0.2 | 2300 |
| Example 8 | 0 | 100 | 5 | 0.1 | 0.5 | 2300 |
| Example 9 | 0 | 100 | 5 | 0.1 | 1.4 | 2300 |
| Example 10 | 0 | 100 | 5 | 0.1 | 0.5 | 2200 |
| Comparative Example 1 | 95.2 | 4.8 | 0 | 0.5 | 0.2 | 2300 |
| Comparative Example 2 | 95.2 | 4.8 | 2 | 0.5 | 0.2 | 2300 |
| Comparative Example 3 | 95.2 | 4.8 | 2 | 0.5 | 5.0 | 2300 |
| Comparative Example 4 | 90.8 | 9.2 | 5 | 0.0 | — | 2300 |
| Comparative Example 5 | 95.2 | 4.8 | 2 | 4.5 | 0.2 | 2300 |
| Comparative Example 6 | 0 | 100 | 20 | 0.1 | 0.2 | 2300 |
| Comparative Example 7 | 0 | 100 | 5 | 0.1 | 0.2 | 2400 |

The $R_{ave}$, $R_{max}/R_{ave}$, $R_{min}/R_{ave}$, relative density, and nitrogen content in the SiC sintered bodies of Examples 1 to 10 and Comparative Examples 1 to 7 are shown in Table 2.

The evaluation shown in Table 2 was carried out based on the following criteria.

○ . . . The $R_{max}/R_{ave}$ is 1.5 or lower, and the $R_{min}/R_{ave}$ is 0.7 or higher, and the relative density is 98% or higher x . . . Other than the above

TABLE 2

|  | $R_{ave}$ Ω · cm | $R_{max}/R_{ave}$ | $R_{min}/R_{ave}$ | Relative density % | Nitrogen content ppm | Evaluation |
| --- | --- | --- | --- | --- | --- | --- |
| Example 1 | 0.30 | 1.33 | 0.75 | 99.0 | 230 | ○ |
| Example 2 | 0.030 | 1.15 | 0.87 | 99.2 | 1570 | ○ |
| Example 3 | 0.40 | 1.20 | 0.83 | 98.2 | 150 | ○ |
| Example 4 | 5.0 | 1.25 | 0.80 | 98.0 | 46 | ○ |
| Example 5 | 0.34 | 1.31 | 0.76 | 98.1 | 4600 | ○ |
| Example 6 | 0.30 | 1.32 | 0.73 | 98.6 | 220 | ○ |
| Example 7 | 0.030 | 1.12 | 0.89 | 98.2 | 580 | ○ |
| Example 8 | 0.030 | 1.13 | 0.88 | 98.6 | 540 | ○ |
| Example 9 | 0.030 | 1.15 | 0.87 | 98.0 | 560 | ○ |
| Example 10 | 0.030 | 1.25 | 0.80 | 98.0 | 530 | ○ |
| Comparative Example 1 | 0.30 | 2.94 | 0.34 | 93.0 | 230 | x |
| Comparative Example 2 | 0.30 | 1.65 | 0.61 | 94.0 | 230 | x |
| Comparative Example 3 | 50 | 6.00 | 0.15 | 92.5 | 150 | x |
| Comparative Example 4 | 100 | 5.60 | 0.22 | 99.1 | <10 | x |
| Comparative Example 5 | 0.30 | 1.55 | 0.66 | 94.0 | 5520 | x |
| Comparative Example 6 | 0.030 | 5.20 | 0.18 | 94.3 | 580 | x |
| Comparative Example 7 | 0.15 | 5.30 | 0.12 | 97.8 | 530 | x |

As shown in Table 2, both the $R_{max}/R_{ave}$ and the $R_{min}/R_{ave}$ were 1.5 or lower in the SiC sintered bodies of Examples 1 to 10 to which the production method of the present invention was applied. From this, it can be said that, in the SiC sintered bodies of Examples 1 to 10, the volume resistivity is unlikely to vary depending on the measurement position.

In addition, the relative density was 98% or higher in the SiC sintered bodies of Examples 1 to 10. From this, it can be said that the SiC sintered bodies of Examples 1 to 10 have a high density.

The SiC sintered bodies of Examples 1 to 10 contain $Si_3N_4$ particles, whereby nitrogen is solid-dissolved therein. As a result, it is considered that free electrons were increased in the SiC sintered bodies of Examples 1 to 10, and $R_{ave}$ was smaller in the SiC sintered bodies of Examples 1 to 10 as compared to the SiC sintered body of Comparative Example 4 in which nitrogen was not solid-dissolved.

The SiC sintered body of Example 1 had a larger amount of SiC ultrafine powder to be mixed than the SiC sintered bodies of Comparative Example 1 and Comparative Example 2. As a result, it is considered that the mixture before sintering in Example 1 became easy to sinter, and therefore the relative density of the SiC sintered body of Example 1 was higher than that of the SiC sintered bodies of Comparative Example 1 and Comparative Example 2.

The SiC sintered body of Example 1 had a larger amount of SiC ultrafine powder to be mixed and a smaller amount of $Si_3N_4$ particles than the SiC sintered body of Comparative Example 5. As a result, it is considered that the mixture before sintering in Example 1 became easy to sinter, and therefore the relative density of the SiC sintered body of Example 1 was higher than that of the SiC sintered body of Comparative Example 5.

The SiC sintered body of Example 3 had a larger amount of SiC ultrafine powder to be mixed and a smaller average particle diameter of $Si_3N_4$ particles than the SiC sintered body of Comparative Example 3. As a result, it is considered that the mixture before sintering in Example 3 became easy to sinter, and therefore the relative density of the SiC sintered body of Example 3 was higher than that of the SiC sintered body of Comparative Example 3. Therefore, the SiC sintered body of Example 3 is considered to be a sintered body which is dense and has few voids.

In addition, although the nitrogen content in the SiC sintered body of Example 3 was equivalent to that of the SiC sintered body of Comparative Example 3, the $R_{ave}$ of the SiC sintered body of Example 3 was smaller than the $R_{ave}$ of the SiC sintered body of Comparative Example 3. This is considered to be due to the fact that there were few voids in the SiC sintered body of Example 3 and free electrons in the SiC sintered body became easy to move.

Example 6, Example 8 and Example 9 are compared with Comparative Example 3. In Example 6, Example 8 and Example 9, the addition amount of the SiC ultrafine powder was more than 2 parts by mass and less than 20 parts by mass, and the average particle diameter of the $Si_3N_4$ particles was in the range of 0.1 μm or higher and 2.0 μm or lower. With such a SiC sintered body, it was found that the relative density of the SiC sintered body was high and the variation in volume resistivity was small. On the other hand, in Comparative Example 3, the addition amount of the SiC ultrafine powder was 2 parts by mass or less, and the average particle diameter of the $Si_3N_4$ particles was higher than 2.0 μm. In such a SiC sintered body, a decrease in relative density of the SiC sintered body was observed. One reason for this is considered to be due to the fact that the SiC sintered body cannot be densified because the addition amount of the SiC ultrafine powder is too small. Another reason is considered to be due to the fact that the SiC sintered body cannot be densified because the average particle diameter of the used $Si_3N_4$ particles is too large.

In addition, although the SiC sintered body of Example 2 contained the same amount of $Si_3N_4$ particles as in the SiC sintered body of Example 1, the nitrogen content in the SiC sintered body was high. This is considered to be due to the fact that nitrogen is easily solid-dissolved in the SiC sintered body as the proportion of the β-SiC powder relative to the total amount of the SiC powder to be mixed increases.

Example 7 and Example 8 are the examples which changed the addition amount of the SiC ultrafine powder with respect to Comparative Example 6. In a case where the addition amount of the SiC ultrafine powder was less than 20 parts by mass as in Example 7 and Example 8, it was found that the relative density was high and the variation in volume resistivity was small. On the other hand, in a case where the addition amount of the SiC ultrafine powder was 20 parts by mass or more as in Comparative Example 6, the $R_{max}/R_{ave}$ was higher than 5 and a decrease in relative density was observed. In Comparative Example 6, it is considered that the filling rate of the particles was lowered because the addition amount of the SiC ultrafine powder was too large. As a result, in Comparative Example 6, it is considered that the variation in volume resistivity was increased and the relative density was decreased.

In a case where Example 1 to Example 10 are compared, the average volume resistivity of the SiC sintered body is high in the Examples having a large amount of α-SiC. Therefore, it has been found that the average volume resistivity of the SiC sintered body can be adjusted to a desired value by arbitrarily changing the mixing amount of α-SiC and β-SiC.

Comparative Example 7 is an example which raised the sintering temperature of Example 2 to 2400° C. or higher. In Example 2, the variation in volume resistivity of the SiC sintered body is small. On the other hand, compared with Example 2, Comparative Example 7 has a large variation in volume resistivity of the SiC sintered body. This is considered to be because SiC with the phase transition from P phase to α phase exists non-uniformly in the SiC sintered body.

Example 5 is an example in which the addition amount of the SiC ultrafine powder and the addition amount of the $Si_3N_4$ particles were changed with respect to Comparative Example 5. In Example 5, the addition amount of the SiC ultrafine powder was more than 2 parts by mass and less than 20 parts by mass, and the addition amount of the $Si_3N_4$ particles was 3 parts by mass or less. In such Example 5, it was found that the relative density of the SiC sintered body was high. On the other hand, in Comparative Example 5, the addition amount of the $Si_3N_4$ particles was more than 3 parts by mass, although the addition amount of the SiC ultrafine powder was more than 2 parts by mass and less than 20 parts by mass. Such Comparative Example 5 was found to have a lower relative density than Example 5.

As one reason for this, it is considered that the $Si_3N_4$ particles cannot be sufficiently solid-dissolved in a case where the addition amount of the $Si_3N_4$ particles is more than 3 parts by mass with respect to 100 parts by mass of the total amount of α-SiC and β-SiC of the raw material powder. Such $Si_3N_4$ particles that cannot be solid-dissolved are sublimated during sintering, thus resulting in formation of voids. Therefore, such a sintered body is considered to have a reduced relative density. In addition, in Example 5 in which the content of nitrogen atoms in the sintered body was 5000 ppm or less, a sintered body having a higher density could be obtained as compared with Comparative Example 5 in which the content of nitrogen atoms in the sintered body was more than 5000 ppm.

From the above results, it was confirmed that the present invention is useful.

INDUSTRIAL APPLICABILITY

According to one aspect of the present invention, provided are a SiC sintered body having a high density and a volume resistivity that is unlikely to vary depending on the measurement position, a heater including the SiC sintered body, and a method for producing a SiC sintered body which is capable of producing the SiC sintered body.

The invention claimed is:

1. A SiC sintered body which contains nitrogen atoms, wherein a ratio $R_{max}/R_{ave}$ of a maximum volume resistivity $R_{max}$ of the SiC sintered body to an average volume resistivity $R_{ave}$ of the SiC sintered body is 1.5 or lower; a ratio $R_{min}/R_{ave}$ of a minimum volume resistivity $R_{min}$ of the SiC sintered body to the average volume resistivity $R_{ave}$ is 0.7 or higher; and
a relative density of the SiC sintered body is 98% or higher,
the volume resistivity of the SiC sintered body is s a value obtained by measuring the SiC sintered body by a four-probe measurement method,
the average volume resistivity of the SiC sintered body is an average value of five measured values obtained for any five places in a plane of the SiC sintered body,
the maximum volume resistivity of the SiC sintered body is a maximum value among the five measured values,
the minimum volume resistivity of the SiC sintered body is the minimum value among the five measured values, and
a content of the nitrogen atoms in the SiC sintered body is 40 to 5000 ppm.

2. The SiC sintered body according to claim 1, wherein a content of the nitrogen atoms in the SiC sintered body is 40 to 1000 ppm.

3. The SiC sintered body according to claim 1, wherein the ratio $R_{max}/R_{ave}$ of a maximum volume resistivity $R_{max}$ of the SiC sintered body to an average volume resistivity $R_{ave}$ of the SiC sintered body is 1.3 or lower; the ratio $R_{min}/R_{ave}$ of a minimum volume resistivity $R_{min}$ of the SiC sintered body to the average volume resistivity $R_{ave}$ is 0.8 or higher.

4. The SiC sintered body according to claim 1, wherein the ratio $R_{max}/R_{ave}$ of a maximum volume resistivity $R_{max}$ of the SiC sintered body to an average volume resistivity $R_{ave}$ of the SiC sintered body is 1.12 to 1.33.

5. The SiC sintered body according to claim 1, wherein the ratio $R_{min}/R_{ave}$ of a minimum volume resistivity $R_{min}$ of the SiC sintered body to the average volume resistivity $R_{ave}$ is 0.75 to 0.89.

6. The SiC sintered body according to claim 1, wherein the ratio $R_{min}/R_{ave}$ is 0.75 to 0.89, and the ratio $R_{max}/R_{ave}$ is 1.12 to 1.33.

7. The SiC sintered body according to claim 1, wherein the ratio $R_{min}/R_{ave}$ is 0.7 to 0.89, and the ratio $R_{max}/R_{ave}$ is 1.12 to 1.5.

8. A heater comprising a heating element which contains the SiC sintered body of claim 1.

9. A method for producing a SiC sintered body, comprising:
a step of mixing
at least one SiC powder having an average particle diameter of 0.1 μm or higher and 1.0 μm or lower and selected from the group consisting of α-SiC powder and β-SiC powder,
a SiC ultrafine powder having an average particle diameter of lower than 0.1 μm and synthesized in a gas phase by plasma CVD, and
$Si_3N_4$ particles having an average particle diameter of 0.1 μm or higher and 2.0 μm or lower; and
a step of sintering a mixture obtained in the step of mixing,
wherein, in the step of mixing, the SiC ultrafine powder is mixed in an amount of more than 2 parts by mass and less than 20 parts by mass with respect to 100 parts by mass of the SiC powder, and
the $Si_3N_4$ particles are mixed in an amount of 0.05 parts by mass or more and 3 parts by mass or less with respect to 100 parts by mass of the SiC powder, and
in the step of sintering, the mixture is sintered at a temperature of 2200° C. or higher and lower than 2400° C.

* * * * *